United States Patent [19]
Van Gemert

[11] 3,783,952
[45] Jan. 8, 1974

[54] ROTARY SOIL WORKING MACHINE

[75] Inventor: Antonius Josephus Van Gemert, Wanroy, Netherlands

[73] Assignee: Van Gemert N.V., Wanroy, Noord-Brabant, Netherlands

[22] Filed: Sept. 29, 1971

[21] Appl. No.: 184,922

Related U.S. Application Data
[63] Continuation-in-part of Ser. No. 824,556, May 14, 1969, abandoned.

[30] Foreign Application Priority Data
May. 17, 1968 Netherlands .................. 6807087

[52] U.S. Cl. ............................. 172/540, 172/123
[51] Int. Cl. ........................................... A01b 33/10
[58] Field of Search .................... 172/42, 123, 540, 172/555, 556, 43, 60, 118, 121, 765

[56] References Cited
UNITED STATES PATENTS

| | | | |
|---|---|---|---|
| 745,816 | 12/1903 | Giger | 172/756 |
| 1,070,192 | 8/1913 | Seck | 172/556 |
| 1,369,954 | 3/1921 | Beasley | 172/765 |
| 2,168,733 | 8/1939 | Dufour | 172/548 |
| 2,663,241 | 12/1953 | Howard | 172/556 |
| 2,765,719 | 10/1956 | Day et al. | 172/76 |
| 2,924,286 | 2/1960 | Franzen | 172/771 |

FOREIGN PATENTS OR APPLICATIONS

| | | | |
|---|---|---|---|
| 145,848 | 9/1950 | Australia | 172/556 |
| 238,143 | 7/1960 | Australia | 172/556 |
| 778,786 | 7/1957 | Great Britain | 172/556 |

*Primary Examiner*—Robert E. Pulfrey
*Assistant Examiner*—Paul T. Sewell
*Attorney*—Marshall & Yeasting

[57] ABSTRACT

A shaft mounted in the machine to rotate on a horizontal axis extending transverse to the travel of the machine carries a plurality of generally radial members lying substantially in a common plane perpendicular to the shaft. A plurality of sod-lifting arms extend axially in the same direction from the ends of the radial members. Each of the arms consists of a substantially flat plate which is L-shaped in outline and consists of a base portion having substantially parallel sides which is attached to the radial member and is raked forward in the direction of rotation and a stem portion having substantially parallel sides which is raked backward.

3 Claims, 3 Drawing Figures

PATENTED JAN 8 1974 3,783,952
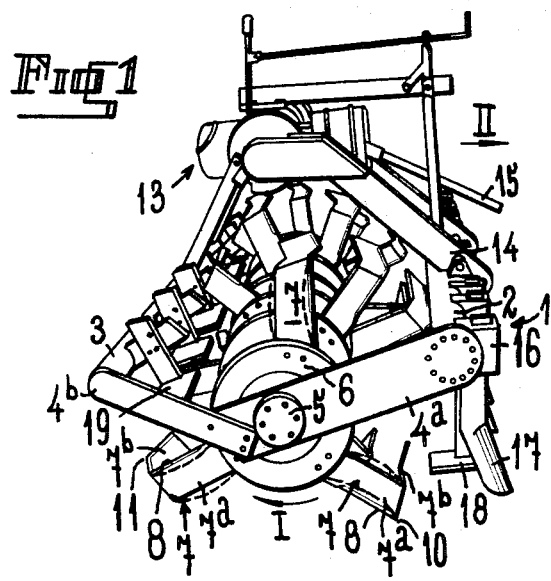
Fig. 1
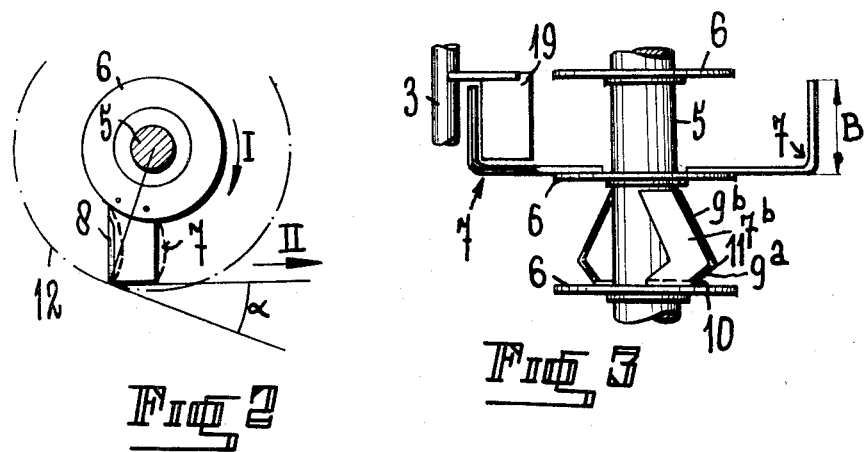
Fig. 2
Fig. 3

ROTARY SOIL WORKING MACHINE

CROSS-REFERENCE TO RELATED APPLICATION

This application is a continuation-in-part of application Ser. No. 824,556, filed May 14, 1969, now abandoned.

BACKGROUND OF THE INVENTION

U.S. Pat. No. 2,765,719, issued to Herbert O. Day and Edward Y. Roberts, shows a rotary soil working machine in which the sod-lifting arms are substantially rectangular in outline. This rotary soil working machine is designed to tear out and lift successive blocks of sod. However, a great amount of power is required in order to force the straight cutting edges of this machine into the ground, particularly since this machine lifts each block of sod straight up instead of turning it to one side.

U.S. Pat. No. 2,168,733, issued to Leon Dufour, shows a rotary soil working machine in which the sod lifting arms are raked backward, the width of each arm becoming narrower toward the end so that each arm tapers into a pointed end. This machine requires less power to operate than the machine shown in U.S. Pat. No. 2,765,719, but the backward-raked tapered arms are relatively inefficient in lifting the sod since they afford relatively little support to each block of sod and tend to draw out from under each block of sod because of their pronounced backward-rake.

The operation of the sod-lifting arms of a rotary digging machine, in cutting or tearing out and lifting successive blocks of sod, is quite different from the operation of an ordinary plow which is pulled through the soil with a linear movement. Plows of various shapes which are drawn through the soil in a linear movement are shown in U.S. Pat. Nos. 745,816, 1,290,490, 1,351,984, 1,369,954 and British Patent No. 981,001 and German Patent No. 901,967. These structures which turn the soil when drawn forward in a linear movement are not suitable for use as sod lifting arms in a rotary soil working machine.

SUMMARY OF THE INVENTION

A rotary soil working machine embodying the invention comprises a shaft mounted to rotate on a horizontal axis extending transverse to the direction of travel of the machine. A plurality of generally radial members are secured to the shaft and lie substantially in a common plane perpendicular to the shaft. The machine includes a plurality of sod-lifting arms each of which extends axially in the same direction from the end of one of the radial members.

Each of the sod-lifting arms in the present machine is unique in that it consists of a substantially flat plate which is L-shaped in outline and consists of a base portion having substantially parallel sides which is attached to the radial member and is raked forward in the direction of rotation, and a stem portion having substantially parallel sides which is raked backward.

This novel structure of the sod-lifting arm of the present machine combines the advantages of the rectangular sod-lifting arms shown in U.S. Pat. No. 2,765,719 in firmly and efficiently supporting each block of sod as it is lifted with the advantages of the arms shown in U.S. Pat. No. 2,168,733 in requiring a relatively low amount of power to cause the arms to cut through the sod.

The present sod-lifting arms support each block of sod efficiently, because the arms extend generally parallel to the axis of the shaft, and both the base portion and the stem portion of each arm have substantially parallel sides. Thus the novel sod-lifting arms of the present invention support each block of sod equally as well as the rectangular sod-lifting arms shown in U.S. Pat. No. 2,765,719.

At the same time, the base portion of each of the present sod-lifting arms is raked forward, and the stem portion is raked backward, and the oblique cutting edges on the leading sides of the base and stem portions of the present sod-lifting arms will cut into the sod smoothly, requiring less power than the rectangular sod-lifting arms shown in U.S. Pat. No. 2,765,719 which have straight axially-extending cutting edges.

One important aspect of the sod-lifting arm of the present machine is that the sod-lifting arm extends axially in one direction from the end of a radial member. Since the sod-lifting arm in the present machine extends to one side of the radial member, a block of sod which is lifted by the arm is able to come free from the arm after being lifted. The radial member is entirely at one side of the block of sod and therefore does not interfere with the free movement of the block of sod.

Another important aspect of the present sod-lifting arm is that the base portion of the arm has substantially parallel sides and is raked forward in the direction of rotation, while the stem portion of the arm also has substantially parallel sides but is raked backward. With this construction, the present arm provides much better and more reliable support for a block of sod than an arm which is only raked backward. At the same time, the forward rake of the base portion of the present sod-lifting arm and the backward rake of the stem portion cause both portions of the present arm to have inclined cutting edges. These inclined cutting edges, which are present along the leading edges of the base portion and the stem portion of the present sod-lifting arm, not only cut into the sod with relatively low consumption of power, but also have a wedging action so as to push aside any roots or similar obstacles which are encountered.

In order to have the bending moments which occur during such encounters restricted to safe limits, and to cause the obstacles to slide off primarily toward the free end of the stem portion of the arm, it is preferable that the axial length of the base portion of each sod-lifting arm be less than the axial length of the stem portion. Most desirably, the axial length of the base portion of each sod-lifting arm is from 60 to 80 percent of the axial length of the stem portion.

BRIEF DESCRIPTION OF THE DRAWINGS

FIG. 1 is a perspective view of a digging machine or soil working machine according to the invention.

FIG. 2 is a fragmentary vertical section, showing a member which is secured to the drive shaft and which carries a sod-lifting arm.

FIG. 3 is a fragmentary plan view of a part of the machine, showing a portion of the drive shaft with sod-lifting arms mounted thereon.

DESCRIPTION OF THE PREFERRED EMBODIMENT

The rotary soil working machine shown in the drawings comprises a frame 1 which is adapted to be supported at the rear of a tractor and consists of a front tubular frame bar 2, a rear tubular frame bar 3 and two pairs of frame members 4a, 4b, interconnecting the ends of the frame bars 2, 3. Only one pair of the frame members 4a, 4b is shown in the drawing. Between the pairs of frame members 4a, 4b a transverse shaft 5 is rotatably mounted. A number of discs 6 are fixed on the shaft 5.

Three generally radial members 7a are secured to each disc 6 and lie substantially in a common plane perpendicular to the shaft 5. Extending axially from the end of each of the radial members 7a is a sod-lifting arm 7b. The sod-lifting arms 7b all extend axially in the same direction, i.e. rearwardly from the plane of the drawing as seen in FIG. 1. Each assembly consisting of a radial member 7a and a sod-lifting arm 7b is designated in the drawing with the reference numeral 7.

Each radial member 7a has a cutting edge 8, while each sod-lifting arm 7b has cutting edges 9a, 9b.

Each of the sod-lifting arms 7b consists of a substantially flat plate which is L-shaped in outline and comprises a base portion having substantially parallel sides, the leading side being the cutting edge 9a, and a stem portion which also has substantially parallel sides, the leading side of the stem portion being the cutting edge 9b. The base portion of the lifting arm is attached to the radial member 7a, and the base portion with its leading cutting edge 9a is raked forward in the direction of rotation indicated by the arrow I. The stem portion of the arm, with its leading cutting edge 9b, is raked backward.

Of the total length B of the sod-cutting arm 7b, the base portion having the cutting edge 9a constitutes about one-third, while the stem portion having the cutting edge 9b constitutes about two-thirds. The cutting edges 9a and 9b intersect in a prow 11 pointing in the direction of rotation.

In order that the outer surface of each sod-lifting arm 7b, while moving around according to the arrow I, may remain free from the soil so that the blocks of sod may be torn loose rather than being merely cut loose, each sod-lifting arm has a certain clearance angle alpha. This clearance angle, which is shown in FIG. 2, is the angle between the outer surface of the sod-lifting arm 7b and a tangent to a circumscribed circle 12 drawn through the prow 11 of the sod-lifting arm. A practical magnitude of this clearance angle, which will permit the blocks of sod to be torn loose and yet supported effectively along the lower part of the path of the sod-lifting arm, is of the order of 30°. By virtue of this clearance angle, the sod-lifting arm forms an acute angle with a radius extending from the axis of the shaft to the prow of the sod-lifting arm, as shown in FIG. 2.

The soil-working rotor, constituted by the shaft 5, the discs 6 and the digging assemblies 7, is driven from the take off shaft of a tractor (not shown) through a transmission 13 which is connected to the remote end of the shaft 5 and is supported by a bracket 14 on the frame 1. The power shaft which is connected to the take off shaft of the tractor is illustrated at 15.

On the front frame bar 2 are provided a number of sleeves 16 which accomodate the colters 17 which follow paths in front of the discs 6 and are provided with skids 18.

On the rear frame bar 3 between the parts 4b are secured a number of striking or ejecting blades 19, which are disposed just within the circumscribed cylindrical surfaces traced by the sod-lifting arms 7b, whereby the blocks of sod which are lifted by the sod-lifting arms are dumped behind the soil-working rotor in the worked ground area.

I claim:

1. A rotary soil working machine comprising a shaft mounted to rotate on a horizontal axis extending transverse to the direction of travel of the machine, and a plurality of generally radial members secured to the shaft and lying substantially in a common plane perpendicular to the shaft, wherein the improvement comprises a sod-lifting arm extending from the end of each of the radial members, consisting of a substantially flat plate which is L-shaped in outline and lies substantially in a plane that is perpendicular to the plane of the radial member and makes an acute angle with a radius drawn from the horizontal axis of the shaft to the outermost point on the leading edge of the radial member, the base portion of the L-shaped plate having substantially parallel sides which are inclined forward from the radial member in the direction of rotary travel, and the stem portion of the L-shaped plate having substantially parallel sides which are inclined backward from the base portion, all of the L-shaped plates lying on the same side of the plane of the radial members.

2. A rotary soil working machine according to claim 1 wherein the length of the base portion of each sod-lifting arm is less than the length of the stem portion.

3. A rotary soil working machine according to claim 1 wherein the length of the base portion of each sod-lifting arm is from 60 to 80% of the length of the stem portion.

* * * * *